Figure 1:
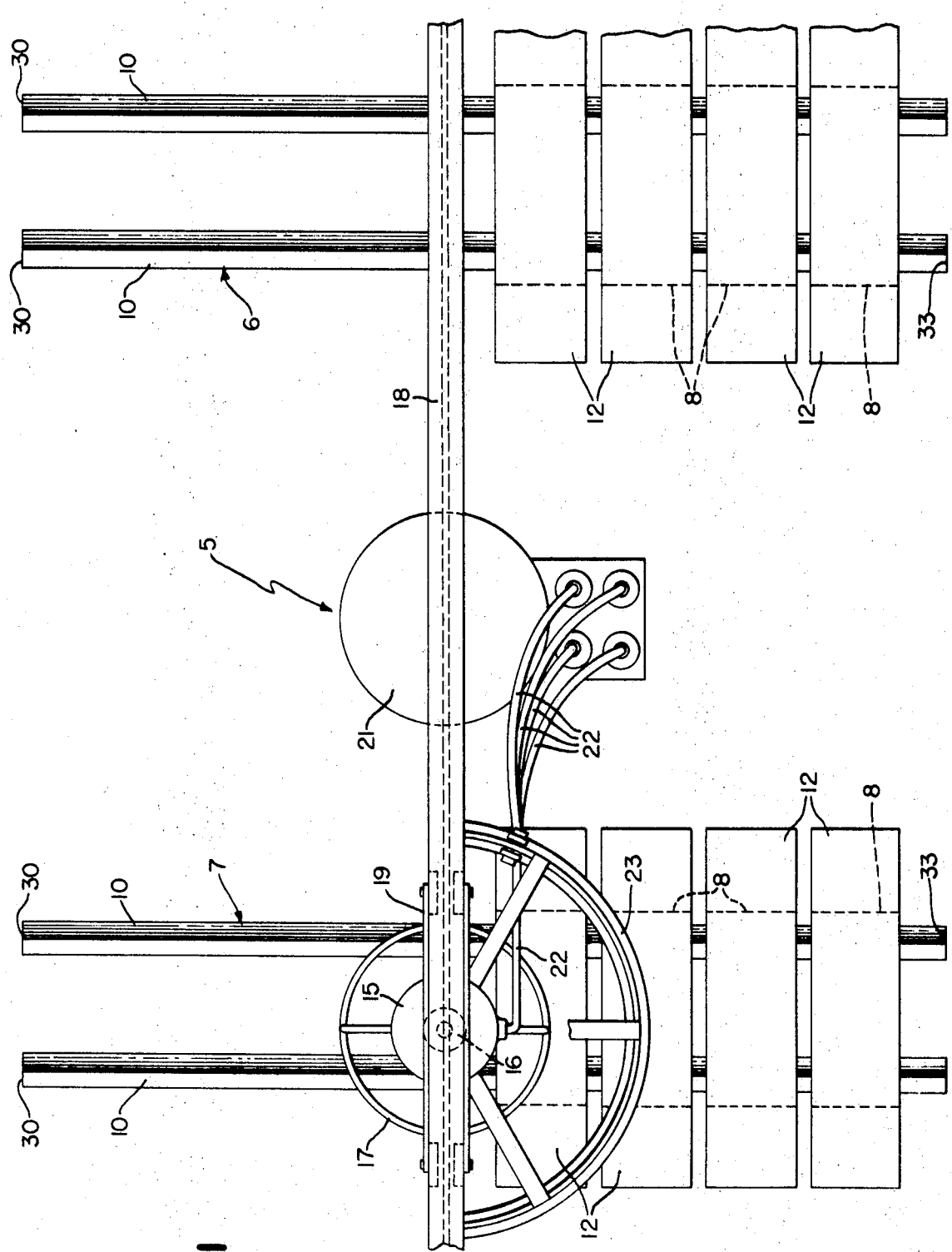

United States Patent

[11] 3,574,888

| [72] | Inventor | Jack E. Holaday |
| | | Logan, Ohio |
| [21] | Appl. No. | 779,415 |
| [22] | Filed | Nov. 27, 1968 |
| [45] | Patented | Apr. 13, 1971 |
| [73] | Assignee | The Goodyear Tire & Rubber Company |
| | | Akron, Ohio |

[54] FOAM MOLDING APPARATUS
2 Claims, 4 Drawing Figs.

[52] U.S. Cl. ............................................. 18/4,
141/170
[51] Int. Cl. ........................................ B29c 3/06,
B29c 1/00, B65b 43/52
[50] Field of Search ................................. 18/2 (I), 4
(B), 4 (C), 4 (M), 4 (P), 5 (A), 5 (BF), 30 (CK),
30 (CM), 30 (CR), 300, 30 (NUM), 30 (NOW),
30 (PM), 30 (NT), 30 (NEF), (Spray digest), 30
(K), (M); 25/41.2, 41.2 (B), 41.3, 103; 141/12
(9), 168, 170, 231

[56] References Cited
UNITED STATES PATENTS

| 1,497,440 | 6/1924 | Guy ................................ | 25/41(.3) |
| 2,028,044 | 1/1936 | Brousseau et al. .............. | 18/4(C)UX |
| 2,816,741 | 12/1957 | Shuffman ...................... | 18/4(B)X |
| 3,040,381 | 6/1962 | Pioch ........................... | 18/4X |
| 3,081,487 | 3/1963 | Heffner et al. ................ | 18/4(B) |
| 3,268,642 | 8/1966 | Hutter ......................... | 18/4(P) |

FOREIGN PATENTS

| 1,371,209 | 7/1964 | France ......................... | 18/4(C) |
| 6,705,097 | 10/1967 | Netherlands ................. | 18/4(B) |

*Primary Examiner*—J. Spencer Overholser
*Assistant Examiner*—R. L. Spicer, Jr.
*Attorneys*—F. W. Brunner and J. D. Wolfe

ABSTRACT: This invention relates to an apparatus for producing molded foam articles having a conveyor system to move a series of molds from a stripping station through a filling station and then return the mold to the stripping station with the foaming apparatus being suspended above the filling station and being movable to another filling station while the molds are being returned to their original position.

Patented April 13, 1971

3,574,888

3 Sheets-Sheet 1

INVENTOR.
JACK E. HOLADAY
BY
ATTORNEY

Patented April 13, 1971

3,574,888

3 Sheets-Sheet 3

INVENTOR.
JACK E. HOLADAY
BY
J. D. Wolfe
ATTORNEY

FOAM MOLDING APPARATUS

This invention relates to an apparatus capable of manipulating molds and pouring foamable mixtures in said molds to mold foamed articles.

In the molding of foamed articles having a skin that has been preformed it is necessary that the molds be of sufficient strength to maintain the preformed skin in the desired configuration while the foam is expanding within the cavity of the preformed skin. This results in the molds being relatively large and bulky and difficult to move. Therefore, it has been the usual practice in molding articles of this sort to arrange the molds on the floor and to carry the foamable material in a cup or suitable throwaway container from the foam mixer to the mold. As the size of the foamed articles have increased and the need to reduce the unit cost has likewise increased, it became more desirable to provide apparatus whereby the foamable material could be fed directly from the foam mixer into the mold but this required the use of relatively long feedlines and other auxiliary equipment which required extremely sensitive metering equipment to maintain the proper blend of the foamable material and consequently the percent rejects was relatively high, in some instances as high as 20 or even 40 percent.

Therefore, an object of this invention is to provide an apparatus whereby the molds and the pouring head may be moved relative to each other to permit molding to be achieved in a semicontinuous manner while feeding the foamable material direct from the foaming apparatus into the mold.

Figure 2:
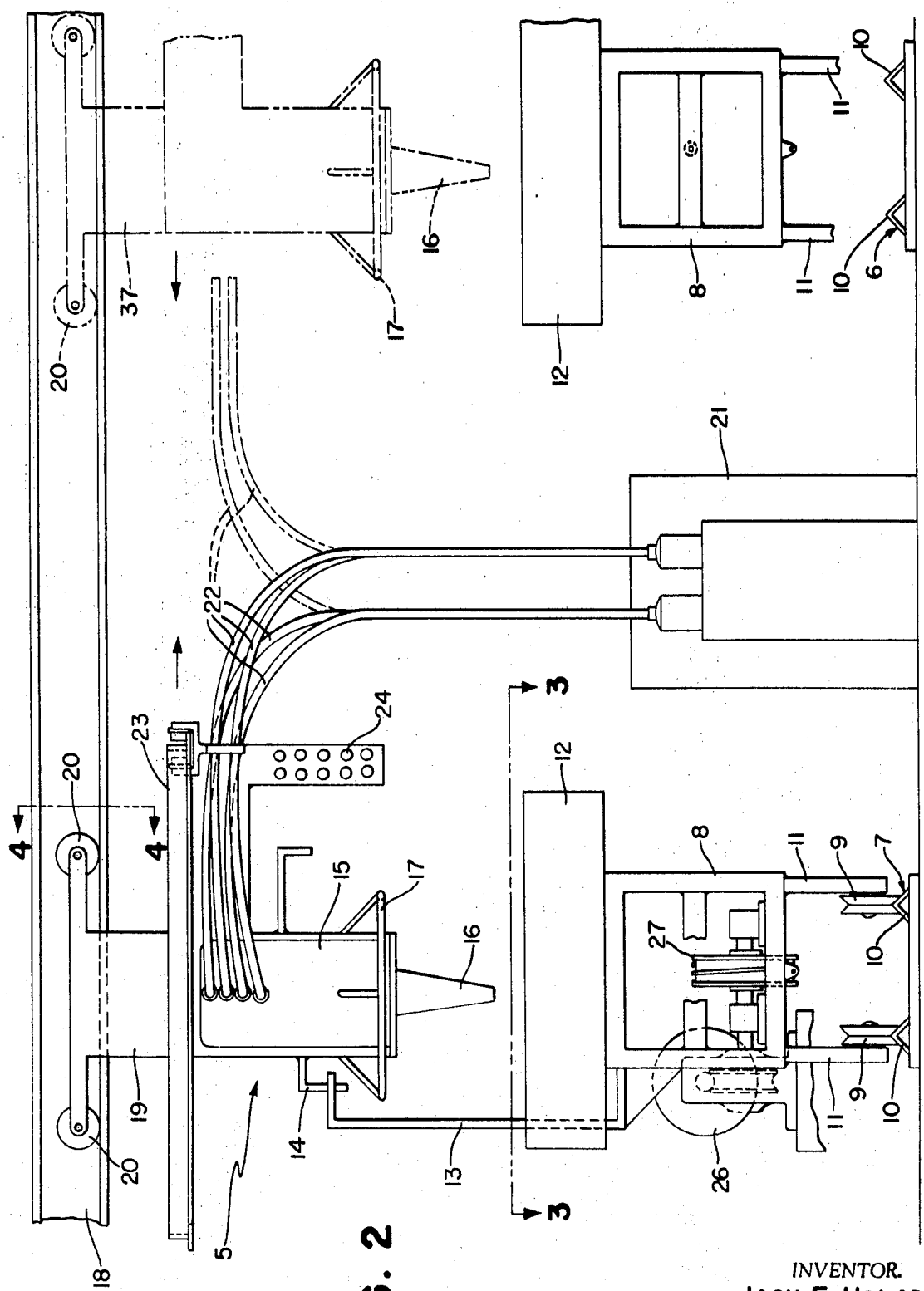
Figure 3:
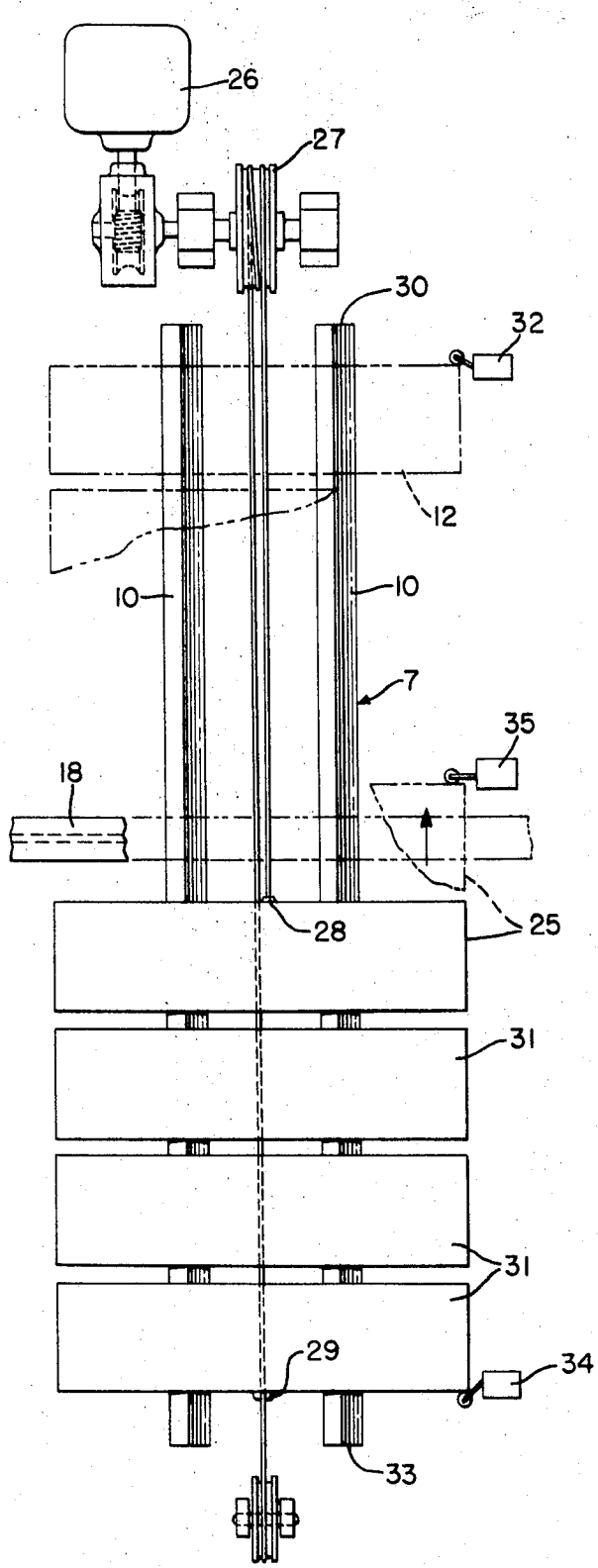
Figure 4:
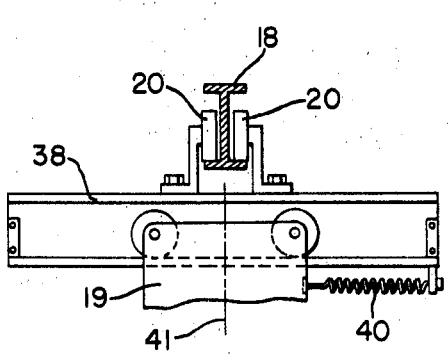

This object and other advantages of this method of molding foamed articles may be more readily appreciated by reference to the drawings wherein FIG. 1 is a plan view of the apparatus; FIG. 2 is an end elevational view; FIG. 3 is a view taken along the lines 3–3 of FIG. 2; and FIG. 4 is a view taken along the lines 4–4 of FIG. 2.

Referring to the drawings, numeral 5 in general represents the apparatus schematically including two sets of parallel tracks 6 and 7 respectively. It should be noted that each set of tracks has resting thereon a series of carriages 8 to hold and move the molds 12. These carriages preferably are interconnected to form a train of carriages.

By reference to FIG. 2 it will be noted that the carriage 8 moves on two sets of wheels 9 which rest upon the individual track 10. These wheels are rotatively mounted within extensions 11 projecting downward from the carriages 8. Resting on the top of the carriage 8 is at least one mold 12 of the type desired for the article to be molded, for instance, an automobile crash pad. It should be noted that projecting upward from the carriage 8 is an arm 13 which can contact arm 14 projecting out from the support 15 for the pouring head 16. Also associated with the pouring head support 15 is a semicircular hand guide rod 17 whereby the operator can move and position the head in proper index over the opening within the mold. This is particularly desirable where the mold opening is a small circular opening instead of a wide groove or slot-shaped opening.

Referring again to FIG. 2, in general it will be noted that over the top of the sets of tracks 6 and 7 there extends in a transverse direction a beam 18 in the manner best seen in FIG. 1. Suspended from this beam 18 by means of a car 19 is the support 15 for the foaming apparatus. Car 19 is suspended on the support beam or track 18 by two wheels 20 and is movable transversely across the pouring apparatus to position the pouring head over the molds on the carriages on the sets of tracks 6 and 7.

Referring again to FIG. 1 it will be noted that the supply pumps and lines for feeding the pouring head are positioned essentially at the midpoint between the two sets of tracks 6 and 7 and this area is generally designated by the numeral 21. Thus the flexible lines 22 for feeding the foamable ingredients to the mixing head 16 extends from the storage area 21 upward through the feedlines support 23 to the pouring head. This arrangement permits the pouring head to move from over the set of tracks 6 to the set of tracks 7 and then back over the set of tracks 6 as the feedlines are free to move back and forth in the area between these two sets of tracks while suspended from the feed support 23. Also, this arrangement allows the feedlines to be kept to a minimum length. It should be noted that this arrangement keeps the feedlines relatively short and lets the feed storage remain stationary while giving a relatively easily movable pouring head. Also associated with the feedline supports 23 is a panel 24 containing various buttons in an electric circuit with motors and solenoid valves that may be actuated to control the feed of various ingredients to the mixing head during the operating cycle.

Referring to FIG. 3 the operation of this apparatus will be discussed in more detail. For instance, the carriage 8 having mold 25 resting thereon is brought to the position shown in FIG. 3, essentially under the central part of the tracks 6 or 7 with the mold open and a preformed skin such as a vinyl resin or ABS-type resin skin resting within the cavity of the mold, the proper button in the panel 24 is pushed to activate the solenoid valve to permit the ingredients to be fed to the foaming machine and a sufficient amount of foamable material is fed into the mold to fill the mold cavity within the skin to the desired degree when the foaming is complete. Then the mold is closed. Since the motor 26 is running, it therefore turns the drum 27, which in FIG. 3 is shown as a worm gear driven device. Rotation of drum 27 causes a wire extending around the drum to be wound on the drum. Since the front end of the wire is attached at point 28 to the front of the series of mold carriages and has the other end attached to the rear end 29 of the mold carriages, the molds are caused to move along the track towards the end 30 as the drum turns clockwise. The mold speed is controlled by the gear ratio selected for the worm gear to advance the mold at a rate to permit the operator to have the next successive mold 31 (note only one mold shown per carriage) ready to receive the foam when the mold moves beneath the pouring head. Thus the carriages tend to move successively forward until the first mold 25 reaches the end of the track 30 and contacts the relay switch 32 which activates an electric switch to reverse the direction of rotation of the motor and thereby causes the drum 27 to rotate in the reverse direction.

This reverse operation of the drum 27 returns the series of molds to the other end 33 of the track. Thus, when the series of carriages returns to the other end of the track 33, they make contact with relay switch 34 which stops the operation of the motor. Thus, the carriages are returned to their original position and the molds may be opened and the foamed articles resting therein removed. Then the molds are prepared to start another cycle.

When the molds are all prepared for the next cycle the operator again pushes the switch in the panel 24 to start the motor and advance the molds in series until they contact relay 35 which indexes the pouring head with the mold and gives the mold the required amount of foam.

Reference to FIG. 1 will disclose that there are two sets of tracks 6 and 7 having a series of molds resting thereon. Thus, while the molds are being returned from the end 30 of the track to the other end 33, the pouring head 16 is moved transversely across the pouring apparatus on support beam 18 to rest over the set of tracks in the position 37 best seen in FIG. 2. With the pouring head resting in the position 37 the series of molds resting on the tracks 7 may be poured as the apparatus associated with this set of tracks is identical with that shown in FIG. 3. When the molds on the carriages on track 7 are poured, the pouring head can be returned to track 6 and pours of foam may be made on track 6 while the motor associated with track 7 is returning the molds on that track to their original position.

In another embodiment of this invention which may be best seen by reference to FIG. 4 it is found that it is not practical to stop the mold while each individual mold is being poured as this materially increases the cost of starting and stopping the train of molds. Also, it has been observed that it is impossible to pour certain molded objects due to their configuration and the nature of the mold openings that is required unless the mold is stopped. To avoid the difficulties of starting and stopping the molds so often, in this embodiment the support 15 for the pouring head is attached to a member 38 which permits the pouring head to move in a limited manner along the tracks while synchronized with the movement of the molds.

Thus, it should be noted that the member 38 may move back and forth transversely beneath the beam 18 to permit the pouring head to travel for a limited distance while in synchronized movement with the movement of the mold. This synchronization of the movement of the pouring head and the mold is best achieved by bringing the pouring head 16 into contact with arm 13 by means of arm 14 to lock the pouring head and mold into an integral unit relationship and thus permit the movement of the mold along the track to pull the pouring head in that direction as the support 15 with its member 38 moves transversely to the direction of the car 19.

When the mold has been poured, the operator uses hand member 17 to swing the pouring head outward to disengage members 13 and 14 and a spring 40 is associated with the support 19 immediately returns the pouring head to the position 41 where the pouring head is again in a position for the operator by swinging downward on the hand member 17 to bring the pouring head arm 14 into register with the arm 13 projecting upward from the next successive mold moving into the pouring position.

Where the foamed article to be manufactured has a preformed skin, it is made by hot melt molding techniques for the thermoplastic resins or polymers or by vacuum forming the skin from a warm film of a thermoplastic resin.

Representative of the many thermoplastic resins or polymers that may be employed in the present invention to cast or form the skin are vinyl polymers preferably in the high viscosity range. Preferred among the latter are the polymers of vinyl chloride, vinyl acetate, vinyl butyral, and copolymers of vinyl chloride and vinyl acetate. A copolymer which has proven satisfactory is one prepared from 93 to 95 percent vinyl chloride and the balance vinyl acetate, with an average molecular weight of approximately 24,000 as determined by the Staudinger method, and having a specific gravity of about 1.34 to 1.37, and softening at approximately 150° F. These above-mentioned polymer materials, when formed for present purposes, require no chemical or other treatment except the addition of a plasticizer. Also, the thermoplastic ABS resin (acrylonitrile-butadiene-butadiene polymer) can be used to form the skin.

Plasticizers are employed which are compatible with these polymers, and which contain no constituents that are, as in the case of the polymers, reactive with atmospheric oxygen in the range of atmospheric temperatures. Examples of such plasticizers are tricresyl phosphate, dioctyl phthalate, dicapryl phthalate, dibutyl sebacate, dibutoxy ethyl phthalate, dibutoxyglycol phthalate, polyethyleneglycol di-2-ethyl hexoate, triethylene-glycol-di-2-ethyl hexoate and the like.

A representative example of how this invention can be practiced is shown below with all parts being by weight unless otherwise indicated.

EXAMPLE I

Using apparatus of the type described in U.S. Ser. No. 645,385 filed Jun. 12, 1967, a box containing a dry commercial powdery plasticized polyvinyl chloride resin was rotated as a unit with a mold for an automobile crash pad. As the mold was at about b 500° F. the powdery polyvinyl chloride fused to form a skin of about 5 to 15 mils in thickness depending on duration of the rotation before excess resin was dumped.

The automobile crash pad skin was removed from the mold and placed in a rigidizing or retaining mold located on one of the carriages shown in FIG. 1. Then as the carriage moved the retaining mold along the track sufficient polyurethane foamable mixture was added to the mold from the pouring head which had been moved above the mold to fill the mold when foaming was complete. Then the solenoid valves in the feed lines to the mixing head was closed to await the arrival of the next mold. When the mold moved from beneath the pouring or mixing head, the mold was closed and the foamable mixture was allowed to foam and cure, as the carriages return to the starting position where the mold was opened and the finished crash pad removed from the mold.

The polyether urethane foamable reaction mixture used to form the crash pad in EXAMPLE I was prepared by mixing about 0.94 equivalents of a polypropylene ether triol, 6.85 equivalents of tolylene diisocyanates, then 180 parts of this mixture is mixed with 3.7 parts of N,N,N',N'-tetrakis (2-hydroxy propyl) ethylene diamine, 15.5 parts of glycerol with varying amounts of amine-type catalysts such as triethylene diamine and/or N-ethyl morpholine and from 1 to 2 parts of an auxiliary blowing agent, $CFCl_3$.

A suitable vinyl plastisol for use in rotational casting a skin in accordance with the above example is:

| | Parts |
|---|---|
| Polyvinyl chloride (dispersion grade) | 100 |
| Di-2-ethylhexylphthalate (plasticizer) | 90 |
| Barium and cadmium salt complex (heat and light stabilizer) | 3 |
| Calcium carbonate (filler) | 10 |
| Mineral oil (internal lubricant) | 2 |

Other vinyl polymers may be used to form plastisols or powder sols, as for example, polyvinyl acetate, polyvinyl alcohol and chlorosulfonated polyethylene and various vinyl copolymers such as a copolymer of vinyl chloride and vinylidene chloride, as are well known in the art. Various plasticizers such as oxidized soybean oil and diethylene glycol may be used and various other ingredients may be added to form films having desirable characteristics as is well known in the art.

Also, other thermoplastic molding powders such as the terpolymer of acrylonitrile, butadiene and styrene may be used to form the skin.

The polyurethane suitable for use in forming the foam may be the reaction product of an organic polyisocyanate and a polyester, a polyether polyol or a polyhydrocarbon polyol with or without the use of an auxiliary blowing agent such as the low boiling materials, for instance, fluorinated hydrocarbons and/or water.

It should be appreciated that the foaming apparatus or mixing head utilizing this invention may be the conventional Admiral Foam Mixing Head with its associated solenoid valves and electric circuitry for activating the valves as illustrated in the panel 24. In general, during the operation of this apparatus, the pumps associated with the storage area 21 are activated and positive pressures maintained on the flexible lines to the mixing head. Thus, when the proper switch in panel 24 is activated the solenoid valves open or close to permit the foaming ingredients to be fed to the mixing head and mixed by the agitator therein and discharged therefrom normally under a slight pressure or the force of gravity.

When a series of molds in the carriage have been poured and the carriage has moved to the stop, it should be appreciated that as the carriage returns the mold to their starting position, the pouring head remains inactive or is moved to an adjacent line where it is used to pour foamed articles on the carriage of the associated track.

While certain representative embodiments and details have been shown for the purpose of illustrating the invention, it will be apparent to those skilled in this art that various changes and modifications may be made therein without departing from the spirit or scope of the invention.

I claim:
1. In a foamed article producing apparatus having a mold conveyor system to move a series of molds from a stripping station through a filling station and then return said molds through the filling station to the stripping station, said filling station having a means for suspending a mold filling means above the molds, said mold filling means having a means associated with the mold as the mold moves to the filling station to activate the mold filling means to control the amount of foamable material added to the mold but to maintain the mold filling means in the inactive position as the molds pass through the filling station on the return to the stripping station.

2. The apparatus of claim 1 wherein the mold filling means moves as a unit with the mold while the mold receives the foamable material and then returns to its original position to await the next mold.